US012748991B2

(12) United States Patent
Wulfmeier et al.

(10) Patent No.: US 12,748,991 B2
(45) Date of Patent: Sep. 29, 2026

(54) HIERARCHICAL POLICIES FOR MULTITASK TRANSFER

(71) Applicant: GDM Holding LLC, Mountain View, CA (US)

(72) Inventors: Markus Wulfmeier, London (GB); Abbas Abdolmaleki, London (GB); Roland Hafner, London (GB); Jost Tobias Springenberg, London (GB); Nicolas Manfred Otto Heess, London (GB); Martin Riedmiller, Balgheim (DE)

(73) Assignee: GDM Holding LLC, Mountain View, CA (US)

( * ) Notice: Subject to any disclaimer, the term of this patent is extended or adjusted under 35 U.S.C. 154(b) by 1163 days.

(21) Appl. No.: 17/613,687

(22) PCT Filed: May 22, 2020

(86) PCT No.: PCT/EP2020/064336
§ 371 (c)(1),
(2) Date: Nov. 23, 2021

(87) PCT Pub. No.: WO2020/239641
PCT Pub. Date: Dec. 3, 2020

(65) Prior Publication Data
US 2022/0237488 A1 Jul. 28, 2022

Related U.S. Application Data

(60) Provisional application No. 62/852,929, filed on May 24, 2019.

(51) Int. Cl.
*G06N 7/01* (2023.01)
*G06N 3/045* (2023.01)
*G06N 20/20* (2019.01)

(52) U.S. Cl.
CPC ............... *G06N 7/01* (2023.01); *G06N 3/045* (2023.01); *G06N 20/20* (2019.01)

(58) Field of Classification Search
CPC ................................ G06N 7/01; G06N 20/00
See application file for complete search history.

(56) References Cited

PUBLICATIONS

Maximilian et al. "Multitask soft Option Learning" (Year: 2019).*

(Continued)

*Primary Examiner* — Van C Mang
(74) *Attorney, Agent, or Firm* — Fish & Richardson P.C.

(57) ABSTRACT

Methods, systems, and apparatus, including computer programs encoded on computer storage media, for controlling an agent. One of the methods includes obtaining an observation characterizing a current state of the environment and data identifying a task currently being performed by the agent; processing the observation and the data identifying the task using a high-level controller to generate a high-level probability distribution that assigns a respective probability to each of a plurality of low-level controllers; processing the observation using each of the plurality of low-level controllers to generate, for each of the plurality of low-level controllers, a respective low-level probability distribution; generating a combined probability distribution; and selecting, using the combined probability distribution, an action from the space of possible actions to be performed by the agent in response to the observation.

14 Claims, 3 Drawing Sheets

(56) References Cited

PUBLICATIONS

Agostini et al. "Reinforcement learning with a Gaussian Mixture Model" (Year: 2010).*
Abbas et al. "Relative Entropy Regularized Policy Iteration" (Year: 2018).*
Abdolmaleki et al., "Maximum a posteriori policy optimization," CoRR, Jun. 14, 2018, arxiv.org/abs/1806.06920, 23 pages.
Abdolmaleki et al., "Relative entropy regularized policy iteration," CoRR, Dec. 5, 2018, arXiv:1812.02256, 23 pages.
Abdolmaleki, "Relative Entropy Regularized Policy Iteration," CoRR, Dec. 2018, arxiv.org/abs/1812.02256, 23 pages.
Agostini et al., "Reinforcement Learning with a Gaussian mixture model," The 2010 International Joint Conference on Neural Networks (IJCNN), Jul. 2010, 8 pages.
Andreas et al., "Modular multitask reinforcement learning with policy sketches," Proceedings of the 34th International Conference on Machine Learning, 2017, 70:166-175.
Andrychowicz et al., "Hindsight experience replay," Advances in Neural Information Processing Systems, 2017, 11 pages.
Andrychowicz et al., "Learning dexterous in-hand manipulation," The International Journal of Robotics Research, Nov. 2019, 39(1):3-20.
Bacon et al., "The option-critic architecture," In Thirty-First AAAI Conference on Artificial Intelligence, Feb. 13, 2017, 31(1):1726-1734.
Bishop, "Mixture density networks," Technical report, Aston University, 1994, 26 pages.
Caruana, "Multitask learning," Jul. 1997, 28(1):41-75.
Daniel et al., "Hierarchical relative entropy policy search," The Journal of Machine Learning Research, 2016, 17(1):3190-3239.
Dayan et al., "Feudal reinforcement learning," Advances in Neural Information Processing Systems, 1992, pp. 271-278.
deepmind.com [online], "AlphaStar: Mastering the real-time strategy game StarCraft II," Jan. 2019, retrieved on Jun. 22, 2022, retrieved from URL<https://www.deepmind.com/blog/alphastar-mastering-the-real-time-strategy-game-starcraft-ii/>; 11 pages.
Espeholt et al., "IMPALA: Scalable distributed deep-rl with importance weighted actor-learner architectures," Proceedings of the 35th International Conference on Machine Learning, 80:1407-1416.
Finn et al., "Model-agnostic meta-learning for fast adaptation of deep networks," Proceedings of the 34th International Conference on Machine Learning, 2017, 70:1126-1135.
French, "Catastrophic forgetting in connectionist networks," Trends in Cognitive Sciences, Apr. 1999, 3(4):128-135.
Galashov et al., "Information asymmetry in kl-regularized RL," CoRR, May 2019, arxiv.org/abs/1905.01240, 25 pages.
Haarnoja et al., "Latent space policies for hierarchical reinforcement learning," Proceedings of the 35th International Conference on Machine Learning, 2018, 80:1851-1860.
Harb et al., "When waiting is not an option: Learning options with a deliberation cost," Thirty-Second AAAI Conference on Artificial Intelligence, Apr. 29, 2018, 32(1):3165-3172.
Harutyunyan et al., "The Termination Critic," CoRR, Feb. 26, 2019, arxiv.org/abs/1902.09996, 13 pages.
Hausman et al., "Learning an embedding space for transferable robot skills," ICLR 2018 Conference Acceptance Decision, Jan. 29, 2018, 16 pages.
Heess et al., "Learning and transfer of modulated locomotor controllers," CoRR, Oct. 17, 2016, arXiv:1610.05182, 13 pages.
Heess et al., "Learning continuous control policies by stochastic value gradients," Advances in Neural Information Processing Systems 28, 2015, 9 pages.
Igl et al., "Multitask Soft Option Learning," Proceedings of the 36th Conference on Uncertainty in Artificial Intelligence, 2020, 124:969-978.
International Preliminary Report on Patentability in International Appln. No. PCT/EP2020/064336, dated Nov. 16, 2021, 10 pages.
International Search Report and Written Opinion in International Appln. No. PCT/EP2020/064336, dated Aug. 26, 2020, 12 pages.
Jaderberg et al., "Reinforcement learning with unsupervised auxiliary tasks," CoRR, Nov. 2016, arXiv:1611.05397, 14 pages.
Jang et al., "Categorical reparameterization with gumbel-softmax," CoRR, Nov. 3, 2016, arXiv:1611.01144, 13 pages.
Kingina et al., "Adam: A method for stochastic optimization," CoRR, Dec. 22, 2014, arXiv:1412.6980, 15 pages.
Kingma et al., "Auto-encoding variational bayes," CoRR, Dec. 2013, arxiv.org/abs/1312.6114, 14 pages.
Maddison et al., "The concrete distribution: A continuous 444 relaxation of discrete random variables," CoRR, Nov. 2, 2016, arXiv:1611.00712, 20 pages.
Mnih et al., "Human-level control through deep reinforcement learning," Nature, Feb. 26, 2015, 518(7540):529-533.
Mnih et al., "Playing atari with deep reinforcement learning." CoRR, Dec. 2013, arxiv.org/abs/1312.5602, 9 pages.
Munos et al., "Safe and efficient off-policy reinforcement learning," Advances in Neural Information Processing Systems 29, 2016, 9 pages.
Nachum et al., "Data-efficient hierarchical reinforcement learning," Advances in Neural Information Processing Systems, 2018, pp. 3303-3313.
Nachum et al., "Near-optimal representation learning for hierarchical reinforcement learning," CoRR, Oct. 2, 2018, arXiv:1810.01257, 18 pages.
Pan et al., "A survey on transfer learning," IEEE Transactions on knowledge and data engineering, 2010, 22(10):1345-1359.
Riedmiller et al., "Learning by playing solving sparse reward tasks from scratch," CoRR, Feb. 2018, arXiv:1802.10567, 18 pages.
Rosenstein et al., "To transfer or not to transfer," NIPS 2005 workshop on transfer learning, Dec. 2005, 898:1-4.
Rusu et al., "Progressive neural networks," CoRR, Jun. 2016, arXiv:1606.04671, 14 pages.
Schulman et al., "Trust region policy optimization," Proceedings of the 32nd International Conference on Machine Learning, 2015, pp. 37:1889-1897.
Shiarlis et al., "Taco: Learning task decomposition via temporal alignment for control," Proceedings of the 35th International Conference on Machine Learning, 2018, 80:4654-4663.
Silver et al., "Mastering the game of go without human knowledge," Nature, Oct. 2017, 550(7676):354-359.
Smith et al., "An inference-based policy gradient method for learning options," Proceedings of the 35th International Conference on Machine Learning, 2018, 80:4703-4712.
Sutton et al., "Between mdps and semi-mdps: A framework for temporal abstraction in reinforcement learning," Artificial intelligence, Aug. 1999, 112(1-2):181-211.
Sutton, "Learning to predict by the methods of temporal differences," Machine learning, Aug. 1988, 3(1):9-44.
Tassa et al., "Deepmind control suite," CoRR, Jan. 2, 2018, arXiv:1801.00690, 24 pages.
The et al., "Distral: Robust multitask reinforcement learning," CoRR, Jul. 2017, arxiv.org/abs/1707.04175, 13 pages.
Tirumala et al., "Exploiting hierarchy for learning and transfer in kl-regularized rl," CoRR, Mar. 18, 2019, arXiv:1903.07438, 22 pages.
Torrey et al., "Transfer learning," Handbook of research on machine learning transfer learning applications and trends: algorithms, methods, and techniques, 2010, pp. 242-264.
Vezhnevets et al., "FeUdal networks for hierarchical reinforcement learning," Proceedings of the 34th International Conference on Machine Learning, 2017, 70:3540-3549.
Wang et al., "Characterizing and avoiding negative transfer," Proceedings of the IEEE/CVF Conference on Computer Vision and Pattern Recognition, 2019, pp. 11293-11302.
Wulfmeier et al., "Mutual alignment transfer learning," CoRR, Jul. 25. 2017, arXiv:1707,07907, 10 pages.
Xie et al., "Transferring task goals via hierarchical reinforcement learning," ICLR 2018 Workshop Submission, Feb. 12, 2018, 9 pages.
Zhang et al., "Dac: The double actor-critic architecture for learning options," CoRR, Apr. 29, 2019, arXiv:1904.12691, 15 pages.

(56) References Cited

PUBLICATIONS

Office Action in European Appln. No. 20728459.7, dated Sep. 18, 2024, 8 pages.

* cited by examiner

HIERARCHICAL POLICIES FOR MULTITASK TRANSFER

CROSS-REFERENCE TO RELATED APPLICATION

This application is a National Stage Application under 35 U.S.C. § 371 and claims the benefit of International Application No. PCT/EP2020/064336, filed May 22, 2020, which claims priority to U.S. Application No. 62/852,929, filed May 24, 2019, entitled HIERARCHICAL POLICIES FOR MULTITASK TRANSFER, the disclosure of which is incorporated herein by reference.

BACKGROUND

This specification relates to controlling agents using neural networks.

Neural networks are machine learning models that employ one or more layers of nonlinear units to predict an output for a received input. Some neural networks include one or more hidden layers in addition to an output layer. The output of each hidden layer is used as input to or more other layers in the network, i.e., one or more other hidden layers, the output layer, or both. Each layer of the network generates an output from a received input in accordance with current values of a respective set of parameters.

SUMMARY

This specification describes a system implemented as computer programs on one or more computers in one or more locations that controls an agent using a hierarchical controller to perform multiple tasks.

Generally, the tasks are multiple different agent control tasks, i.e., tasks that include controlling the same mechanical agent to cause the agent to accomplish different objectives within the same real-world environment. The agent can be, e.g., a robot or an autonomous or semi-autonomous vehicle. For example, the tasks can include causing the agent to navigate to different locations in the environment, causing the agent to locate different objects, causing the agent to pick up different objects or to move different objects to one or more specified locations, and so on.

The hierarchical controller includes multiple low-level controllers that are not conditioned on task data (data identifying a task) and that only receive observations and a high-level controller that generates, from task data and observations, task-dependent probability distributions over the low-level controllers.

In one aspect a computer implemented method of controlling an agent to perform a plurality of tasks while interacting with an environment includes obtaining an observation characterizing a current state of the environment and data identifying a task from the plurality of tasks currently being performed by the agent, and processing the observation and the data identifying the task using a high-level controller to generate a high-level probability distribution that assigns a respective probability to each of a plurality of low-level controllers. The method also includes processing the observation using each of the plurality of low-level controllers to generate, for each of the plurality of low-level controllers, a respective low-level probability distribution that assigns a respective probability to each action in a space of possible actions that can be performed by the agent, and generating a combined probability distribution that assigns a respective probability to each action in the space of possible actions by computing a weighted sum of the low-level probability distributions in accordance with the probabilities in the high-level probability distribution. The method may then further comprise selecting, using the combined probability distribution, an action from the space of possible actions to be performed by the agent in response to the observation.

In implementations of the method the high-level controller and the low-level controllers have been trained jointly on a multi-task learning reinforcement learning objective, that is a reinforcement learning objective which depends on an expected reward when performing actions for the plurality of tasks.

A method of training a controller comprising the high-level controller and the low-level controllers includes sampling one or more trajectories from a memory, e.g. a replay buffer, and a task from the plurality of tasks. A trajectory may comprise a sequence of observation-action-reward tuples; a reward is recorded for each of the tasks.

The training method may also include determining from a state-action value function, for the observations in the sampled trajectories, an intermediate probability distribution over the space of possible actions for the observation and for the sampled task.

The state-action value function maps an observation-action-task input to a Q value estimating a return received for the task if the agent performs the action in response to the observation. The state-action value function may have learnable parameters, e.g. parameters of a neural network configured to provide the Q value.

The training method may include determining updated values for the parameters of the high-level controller and the low-level controllers by adjusting the parameters to decrease a divergence between the intermediate probability distribution for the observation and for the sampled task and a probability distribution, e.g. the combined probability distribution, for the observation and the sampled task generated by the hierarchical controller. The training method may also include determining updated values for the parameters of the high-level controller and the low-level controllers by adjusting the parameters subject to a constraint that the adjusted parameters remain within a region or bound, that is a "trust region" of the current values of the parameters of the high-level controller and the low-level controllers. The trust region may limit the decrease in divergence.

The training method may also include updating the state-action value function e.g. using any Q-learning algorithm, e.g. by updating the learnable parameters of the neural network configured to provide the Q value. This may be viewed as performing a policy improvement step, in particular to provide an improved target for updating the parameters of the controller.

Particular embodiments of the subject matter described in this specification can be implemented so as to realize one or more of the following advantages.

This specification describes a hierarchical controller for controlling an agent interacting with an environment to perform multiple tasks. In particular, by not conditioning the low-level controllers on task data and instead allowing the high-level controller to generate a task-and-state dependent probability distribution over the task-independent low-level controllers, knowledge can effectively be shared across the multiple tasks in order to allow the hierarchical controller to effectively control the agent to perform all of the tasks.

Additionally, the techniques described in this specification allow a high-quality multi-task policy to be learned in an extremely stable and data efficient manner. This makes the described techniques particularly useful for tasks performed by a real, i.e., real-world, robot or other mechanical agent, as wear and tear and risk of mechanical failure as a result of repeatedly interacting with the environment are greatly reduced. Additionally, the described techniques can be used to learn an effective policy even on complex, continuous control tasks and can leverage auxiliary tasks to learn a complex final task using interaction data collected by a real-world robot much quicker and while consuming many fewer computational resources than conventional techniques.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that controls an agent using a hierarchical controller to perform multiple tasks.

Generally, the tasks are multiple different agent control tasks, i.e., tasks that include controlling the same mechanical agent to cause the agent to accomplish different objectives within the same real-world environment or within a simulated version of the real-world environment.

The agent can be, e.g., a robot or an autonomous or semi-autonomous vehicle. For example, the tasks can include causing the agent to navigate to different locations in the environment, causing the agent to locate different objects, causing the agent to pick up different objects or to move different objects to one or more specified locations, and so on.

Figure 1:
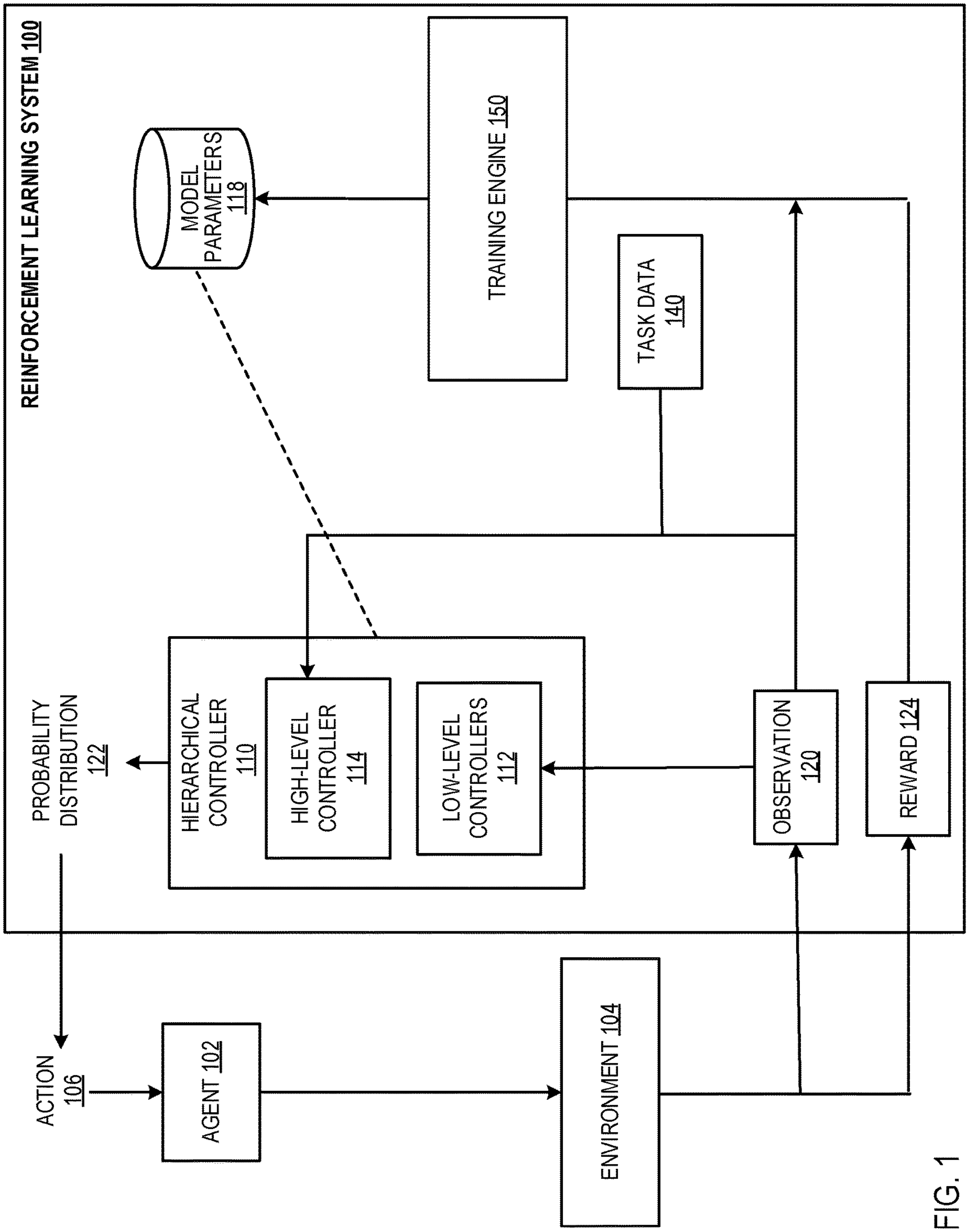
FIG. 1 shows an example control system.

FIG. 1 shows an example control system 100. The control system 100 is an example of a system implemented as computer programs on one or more computers in one or more locations in which the systems, components, and techniques described below are implemented.

The system 100 includes a hierarchical controller 110, a training engine 150, and one or more memories storing a set of policy parameters 118 of the hierarchical controller 110.

The system 100 controls an agent 102 interacting with an environment 104 by selecting actions 106 to be performed by the agent 102 in response to observations 120 and then causing the agent 102 to perform the selected actions 106.

Performance of the selected actions 106 by the agent 102 generally causes the environment 104 to transition into new states. By repeatedly causing the agent 102 to act in the environment 104, the system 100 can control the agent 102 to complete a specified task.

In particular, the control system 100 controls the agent 102 using the hierarchical controller 110 in order to cause the agent 102 to perform the specified task in the environment 104.

As described above, the system 100 can use the hierarchical controller 110 in order to control the robot 102 to perform any one of a set of multiple tasks.

In some cases, one or more of the tasks are main tasks while the remainder of the tasks are auxiliary tasks, i.e., tasks that are designed to assist in the training of the hierarchical controller 110 to perform the one or main tasks. For example, when the main tasks involve performing specified interactions with particular types of objects in the environment, examples of auxiliary tasks can include simpler tasks that relate to the main tasks, e.g., navigating to an object of the particular type, moving an object of the particular type, and so on. Because their only purpose is to improve the performance of the agent on the main task(s), auxiliary tasks are generally not performed after training of the hierarchical controller 110.

In other cases, all of the multiple tasks are main tasks and are performed both during the training of the hierarchical controller 110 and after training, i.e., at inference or test time.

In particular, the system 100 can receive, e.g., from a user of the system, or generate, e.g., randomly, task data 140 that identifies the task from the set of multiple tasks that is to be performed by the agent 102. For example, during training of the controller 110, the system 100 can randomly select a task, e.g., after every task episode is completed or after every N actions that are performed by the agent 102. After training of the controller 110, the system 100 can receive user inputs specifying the task that should be performed at the beginning of each episode or can select the task to be performed randomly from the main tasks in the set at the beginning of each episode.

Each input to the controller 110 can include an observation 120 characterizing the state of the environment 104 being interacted with by the agent 102 and the task data 140 identifying the task to be performed by the agent.

The output of the controller 110 for a given input can define an action 106 to be performed by the agent in response to the observation. More specifically, the output of the controller 110 defines a probability distribution 122 over possible actions to be performed by the agent.

The observations 120 may include, e.g., one or more of: images, object position data, and sensor data to capture observations as the agent interacts with the environment, for example sensor data from an image, distance, or position sensor or from an actuator. For example in the case of a robot, the observations may include data characterizing the current state of the robot, e.g., one or more of: joint position, joint velocity, joint force, torque or acceleration, e.g., gravity-compensated torque feedback, and global or relative pose of an item held by the robot. In other words, the observations may similarly include one or more of the position, linear or angular velocity, force, torque or acceleration, and global or relative pose of one or more parts of the agent. The observations may be defined in 1, 2 or 3 dimensions, and may be absolute and/or relative observations. The observations may also include, for example, sensed electronic signals such as motor current or a temperature signal; and/or image or video data for example from a camera or a LIDAR sensor, e.g., data from sensors of the agent or data from sensors that are located separately from the agent in the environment.

The actions may be control inputs to control the mechanical agent e.g. robot, e.g., torques for the joints of the robot or higher-level control commands, or the autonomous or semi-autonomous land, air, sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment. For example in the case of an autonomous or semi autonomous land or air or sea vehicle the actions may include actions to control navigation, e.g., steering, and movement e.g., braking and/or acceleration of the vehicle.

The system 100 can then cause the agent to perform an action using the probability distribution 122, e.g., by selecting the action to be performed by the agent by sampling from the probability distribution 122 or by selecting the highest-probability action in the probability distribution 122. In some implementations, the system 100 may select the action in accordance with an exploration policy, e.g., an epsilon-greedy policy or a policy that adds noise to the probability distribution 122 before using the probability distribution 122 to select the action.

In some cases, in order to allow for fine-grained control of the agent 102, the system 100 may treat the space of actions to be performed by the agent 102, i.e., the set of possible control inputs, as a continuous space. Such settings are referred to as continuous control settings. In these cases, the output of the controller 110 can be the parameters of a multi-variate probability distribution over the space, e.g., the means and covariances of a multi-variate Normal distribution. More precisely, the output of the controller 110 can be the means and diagonal Cholesky factors that define a diagonal covariance matrix for the multi-variate Normal distribution.

The hierarchical controller 110 includes a set of low-level controllers 112 and a high-level controller 114. The number of low-level controllers 112 is generally fixed to a number that is greater than one, e.g., three, five, or ten, and can be independent of the number of tasks in the set of multiple tasks.

Each low-level controller 112 is configured to receive the observation 120 and process the observation 120 to generate a low-level controller output that defines a low-level probability distribution that assigns a respective probability to each action in the space of possible actions that can be performed by the agent.

As a particular example, when the space of actions is continuous, each low-level controller 112 can output the parameters of a multi-variate probability distribution over the space.

The low-level controllers 112 are not conditioned on the task data 140, i.e., do not receive any input identifying the task that is being performed by the agent. Because of this, the low-level controllers 112 learn to acquire general, task-independent behaviors. Additionally, not conditioning the low-level controllers 112 on task data strengthens decomposition of tasks across domains and inhibits degenerate cases of bypassing the high-level controller 114.

The high-level controller 114, on the other hand, receives as input the observation 120 and the task data 140 and generates a high-level probability distribution that assigns a respective probability to each of the low-level controllers 112. That is, the high-level probability distribution is a categorical distribution over the low-level controllers 112. Thus, the high-level controller 114 learns to generate probability distributions that reflect a task-specific and observation-specific weighting of the general, task-independent behaviors represented by the low-level probability distributions.

The controller 110 then generates, as the probability distribution 122, a combined probability distribution over the actions in the space of actions by computing a weighted sum of the low-level probability distributions defined by the outputs of the low-level controllers 112 in accordance with the probabilities in the high-level probability distribution generated by the high-level controller 114.

The low-level controllers 112 and the high-level controller 114 can each be implemented as respective neural networks.

In particular, the low-level controllers 112 can be neural networks that have appropriate architectures for mapping an observation to an output defining low-level probability distributions while the high-level controller 114 can be a neural network that has an appropriate architecture for mapping the observation and task data to a categorical distribution over the low-level controllers.

As a particular example, the low-level controllers 112 and the high-level controller 114 can have a shared encoder neural network that encodes the received observation into an encoded representation.

For example, when the observations are images, the encoder neural network can be a stack of convolutional neural network layers, optionally followed by one or more fully connected neural network layers and/or one or more recurrent neural network layers, that maps the observation to a more compact representation. When the observations include additional features in addition to images, e.g., proprioceptive features, the additional features can be provided as input to the one or more fully connected layers with the output of the convolutional stack.

When the observations are only lower-dimensional data, the encoder neural network can be multi-layer perceptron that encodes the received observation.

Each low-level controller 112 can then process the encoded representation through a respective stack of fully-connected neural network layers to generate a respective set of multi-variate distribution parameters.

The high-level controller 114 can process the encoded representation and the task data to generate the logits of the categorical distribution over the low-level controller 114.

For example, the high-level controller 114 can include a respective stack of fully-connected layers for each task that generates a set of logits for the corresponding task from the encoded representation, where the set of logits includes a respective score for each of the low-level controllers.

The high-level controller 114 can then select the set of logits for the task that is identified in the task data, i.e., generated by the stack that is for the task corresponding to the task data, and then generate the categorical distribution from the selected set of logits, i.e., by normalizing the logits by applying a softmax operation.

The parameters of the hierarchical controller 110, i.e., the parameters of the low-level controllers 112 and the high-level controller 114, will be collectively referred to as the "policy parameters."

Thus, by structuring the hierarchical controller 110 in this manner, i.e., by not conditioning the low-level controllers on task data and instead allowing the high-level controller to generate a task-and-state dependent probability distribution over the task-independent low-level controllers, knowledge can effectively be shared across the multiple tasks in order to allow the hierarchical controller 110 to effectively control the agent to perform all of the multiple tasks.

The system 100 uses the probability distribution 122 to control the agent 102, i.e., to select the action 106 to be performed by the agent at the current time step in accordance with an action selection policy and then cause the agent to perform the action 106, e.g., by directly transmitting control signals to the robot or by transmitting data identifying the action 106 to a control system for the agent 102.

The system 100 can receive a respective reward 124 at each time step. Generally, the reward 124 includes a respective reward value, i.e., a respective scalar numerical value, for each of the multiple tasks. Each reward value characterizes, e.g., a progress of the agent 102 towards completing the corresponding task. In other words, the system 100 can receive a reward value for a task i even when the action was performed by while conditioned on task data identifying a different task j.

In order to improve the control of the agent 102, the training engine 150 repeatedly updates the policy parameters 118 of the hierarchical controller 110 to cause the hierarchical controller 110 to generate more accurate probability distributions, i.e., that result in higher rewards 124 being received by system 100 for the task specified by the task data 140 and, as a result, improve the performance of the agent 102 on the multiple tasks.

In other words, the training engine 150 trains the high-level controller and the low-level controllers jointly on a multi-task learning reinforcement learning objective e.g. the objective J described below.

As a particular example, the multi-task objective can measure, for any given observation, the expected return received by the system 100 starting from the state characterized by the given observation for a task sampled from the set of tasks if the agent is controlled by sampling from the probability distributions 122 generated by the hierarchical controller 110. The return is generally a time-discounted combination, e.g., sum, of rewards for the sampled task received by the system 100 starting from the given observation.

In particular, the training engine 150 updates the policy parameters 118 using a reinforcement learning technique that decouples a policy improvement step in which an intermediate policy is updated with respect to a multi-task objective from the fitting of the hierarchical controller 110 to the intermediate policy. In implementations the reinforcement learning technique is an iterative technique that interleaves the policy improvement step and fitting the hierarchical controller 110 to the intermediate policy.

Training the hierarchical controller 110 is described in more detail below with reference to FIG. 3.

Once the hierarchical controller 110 is trained, the system 100 can either continue to use the hierarchical controller 110 to control the agent 102 in interacting with the environment 104 or provide data specifying the trained hierarchical controller 110, i.e., the trained values of the policy parameters, to another system for use in controlling the agent 102 or another agent.

Figure 2:
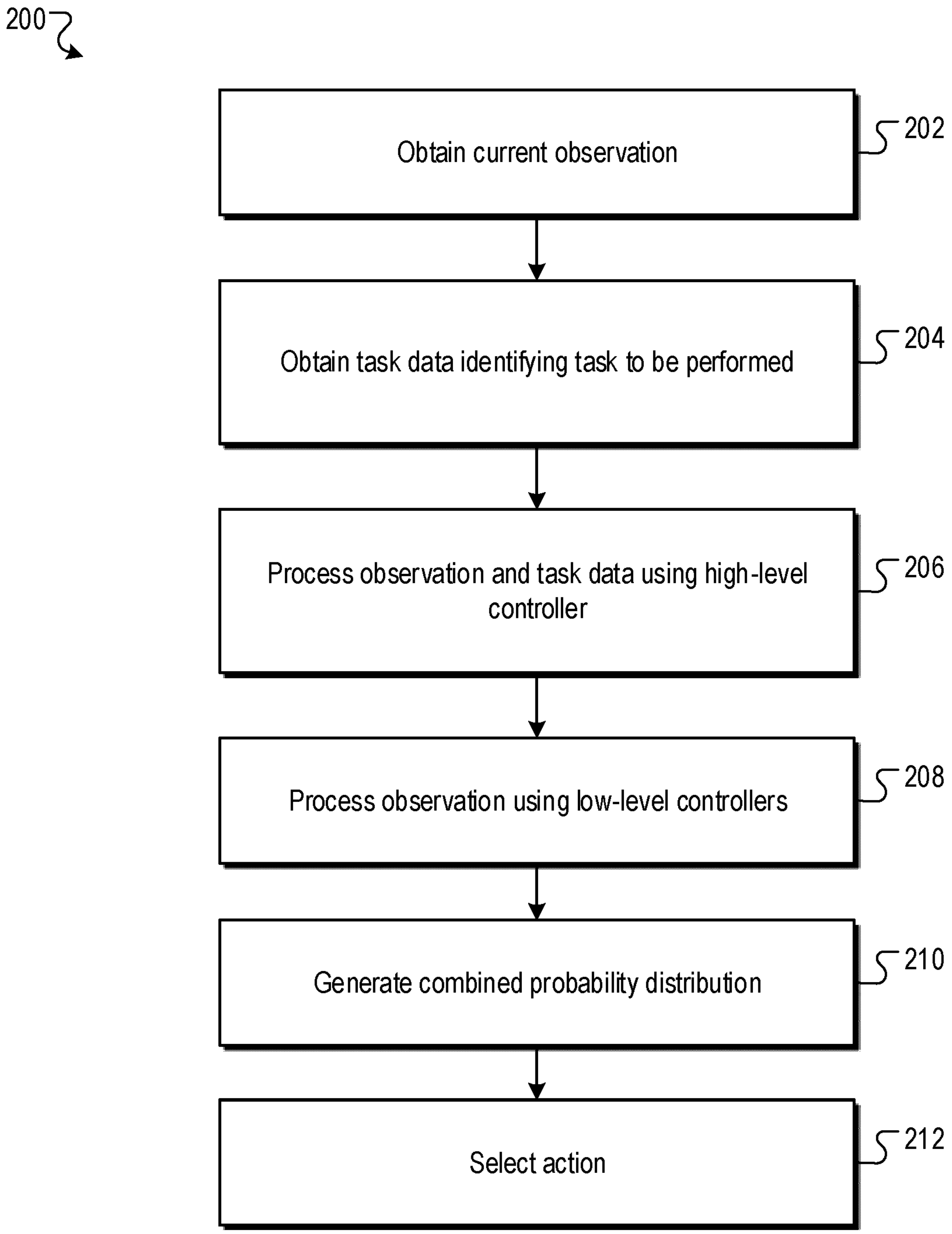
FIG. 2 is a flow diagram of an example process for controlling an agent.

FIG. 2 is a flow diagram of an example process 200 for controlling the agent. For convenience, the process 200 will be described as being performed by a system of one or more computers located in one or more locations. For example, a control system, e.g., the control system 100 of FIG. 1, appropriately programmed, can perform the process 200.

The system can repeatedly perform the process 200 starting from an initial observation characterizing an initial state of the environment to control the agent to perform one of the multiple tasks.

The system obtains a current observation characterizing a current state of the environment (step 202).

The system obtains task data identifying a task from the plurality of tasks, i.e., from the set of multiple tasks, that is currently being performed by the agent (step 204). As described above, the task being performed by the agent can either be selected by the system or provided by an external source, e.g., a user of the system.

The system processes the current observation and the task data identifying the task using a high-level controller to generate a high-level probability distribution that assigns a respective probability to each of a plurality of low-level controllers (step 206). In other words, the output of the high-level controller is a categorical distribution over the low-level controllers.

The system processes the current observation using each of the plurality of low-level controllers to generate, for each of the plurality of low-level controllers, a respective low-level probability distribution that assigns a respective probability to each action in a space of possible actions that can be performed by the agent (step 208). For example, each low-level controller can output parameters of a probability distribution over a continuous space of actions, e.g., of a multi-variate Normal distribution over the continuous space. As a particular example, the parameters can be the means and covariances of the multi-variate Normal distribution over the continuous space of actions.

The system generates a combined probability distribution that assigns a respective probability to each action in the space of possible actions by computing a weighted sum of the low-level probability distributions in accordance with the probabilities in the high-level probability distribution (step 210). In other words, the combined probability distribution $\pi_\theta(a|s, i)$ can be expressed as:

$$\pi_\theta(a \mid s, i) = \sum\nolimits_{o=1}^{M} \pi_o^L(a \mid s, o)\pi_o^H(o \mid s, i),$$

where s is the current observation, i is the task from the set I of multiple tasks currently being performed, o ranges from 1 to the total number of low-level controllers $$M, \pi_o^L(a|s, o)$$

is the low-level probability distribution defined by the output of the o-th low-level controller and $$\pi_o^H(o|s, i)$$

is the probability assigned to the o-th low-level controller in the high-level probability distribution.

The system selects, using the combined probability distribution, an action from the space of possible actions to be performed by the agent in response to the observation (step 212).

For example, the system can sample from the combined probability distribution or select the action with the highest probability.

Figure 3:
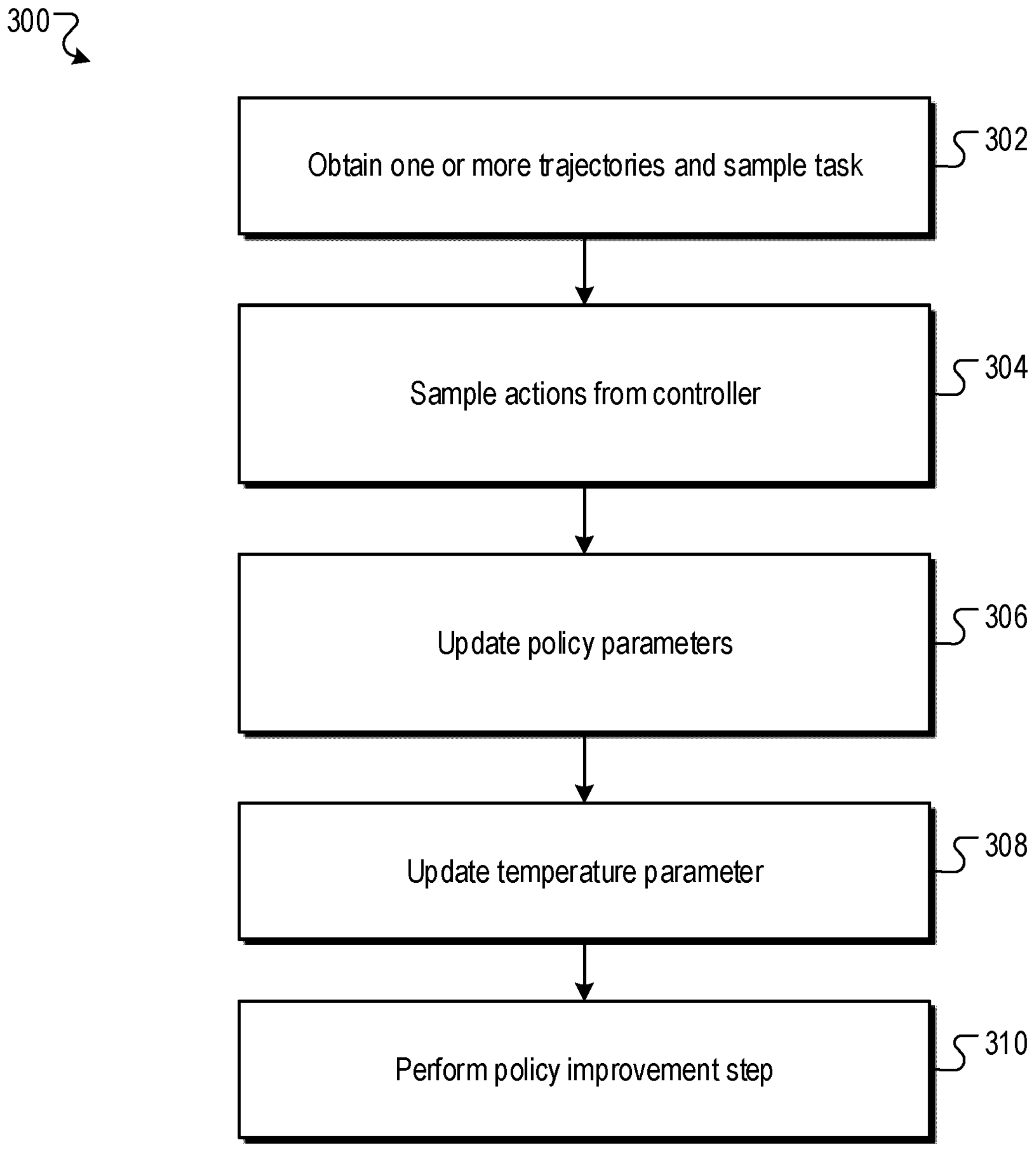
FIG. 3 is a flow diagram of an example process for training the hierarchical controller.

FIG. 3 is a flow diagram of an example process 300 for training the hierarchical controller. For convenience, the process 300 will be described as being performed by a system of one or more computers located in one or more locations. For example, a control system, e.g., the control system 100 of FIG. 1, appropriately programmed, can perform the process 300.

The system can repeatedly perform the process 300 on different batches of one or more trajectories to train the high-level controller, i.e., to repeatedly update the current values of the parameters of the low-level controller and the high-level controller.

The system samples a batch of one or more trajectories from a memory and a task from the plurality of tasks that can be performed by the agent (step 302).

The memory, which can be implemented on one or more physical memory devices, is a replay buffer that stores trajectories generated from interactions of the agent with the environment.

Generally, each trajectory includes observation-action-reward tuples, with the action in each tuple being the action performed by the agent in response to the observation in the tuple and the reward in each tuple including a respective reward value for each of the tasks that was received in response to the agent performing the action in the tuple.

The system can sample the one or more trajectories, e.g., at random or using a prioritized replay scheme in which some trajectories in the memory are prioritized over others.

The system can sample the task from the plurality of tasks in any appropriate manner that ensures that various tasks are used throughout the training. For example, the system can sample a task uniformly at random from the set of multiple tasks.

The system then updates the current values of the policy parameters using the one or more sampled trajectories and the sampled task.

In particular, during the training, the system makes use of an intermediate non-parametric policy q that maps observations and task data to an intermediate probability distribution and that is independent of the architecture of the hierarchical controller.

The intermediate non-parameteric policy q is generated using a state-action value function. The state-action value function maps an observation-action-task input to a Q value estimate, that is an estimate of a return received for the task if the agent performs the action in response to the observation. In other words, the state-action value function generates Q values that are dependent on the state that the environment is in and the task that is being performed. The state-action value function may be considered non-parametric in the sense that it is independent of the policy parameters.

The system can implement the state-action value function as a neural network that maps an input that includes an observation, data identifying an action, and data identifying a task to a Q value.

The neural network can have any appropriate architecture that maps such an input to a scalar Q value. For example, the neural network can include an encoder neural network similar to (but not shared with) the high-level and low-level controllers that additionally takes as input the data identifying the action and outputs an encoded representation. The neural network can also include a respective stack of fully-connected layers for each task that generates a Q value for the corresponding task from the encoded representation. The neural network can then select the Q value for the task that is identified in the task data to be the output of the neural network.

More specifically, the intermediate non-parametric policy q as of an iteration k of the process 300 can be expressed as:

$$q_k(a \mid s, i) \propto \pi_{\theta_k}(a \mid s, i)\exp\left(\frac{\hat{Q}(s, a, i)}{\eta}\right),$$

where $\pi_{\theta_k}(a|s, i)$ is the probability assigned to an action a by the combined probability distribution generated by processing an observation s, and a task i in accordance with current values of the policy parameters θ as of iteration k, $\hat{Q}(s, a, i)$ is the output of the state-action value function for the action a, the observation s, and the task i and η is a temperature parameter. The exponential factor may be viewed as a weight on the action probabilities; the temperature parameter may be viewed as controlling diversity of the actions contributing to the weighting.

Thus, as mentioned above, this policy representation q is independent of the form of the parametric policy, i.e., the high-level controller π; i.e., q only depends on $\pi_{\theta_k}$ through its density.

The system can then train the hierarchical controller to optimize a multi-task objective J that satisfies the following:

$$\max_q J(q, \pi_{ref}) = E_{i\sim I}\left[E_{\pi, s\sim D}\left[\hat{Q}(s, a, i)\right]\right],$$

$$\text{s.t. } E_{s\sim D, i\sim I}[KL(q(\cdot|s, i)\|\pi_{ref}(\cdot|s, i))] \le \varepsilon$$

where E is expectation operator, D is the data in the memory (i.e. trajectories in the replay buffer), $\hat{Q}(s, a, i)$ is the output of the state-action value function for an action a, an observation s, and a task i sampled from the set of tasks I, KL is the Kullback Leibler divergence, q(•|s, i) is the intermediate probability distribution generated using the state-action value function $\hat{Q}$, and $\pi_{ref}(\cdot|s, i)$ is a probability distribution generated by a reference policy e.g. an older policy (combined probability distribution) before a set of iterative updates. In some cases, the bound ε is made up of separate bounds for the categorical distributions, the means of the low-level distributions, and the covariances of the low-level distributions.

During training, the system optimizes the objective by decoupling the updating of the state-action value function (policy evaluation) from updating the hierarchical controller.

More specifically, to optimize this objective, at each iteration of the process 300, the system determines updated values for the parameters of the high-level controller and the low-level controllers that (i) result in a decreased divergence between, for the observations in the one or more trajectories, 1) the intermediate probability distribution over the space of possible actions for the observation and for the sampled task generated using the state-action value function and 2) a probability distribution for the observation and the sampled task generated by the hierarchical controller while (ii) are still within a trust region of the current values of the parameters of the high-level controller and the low-level controllers.

After estimating $\hat{Q}(s, a, i)$, the non-parametric policy $q_k(a|s, i)$ may be determined in closed form as given above, subject to the above bound on KL divergence ϵ. Then the policy parameters may be updated by decreasing the (KL)

divergence as described, subject to additional regularization to constrain the parameters within a trust region. Thus the training process may be subject to a (different) respective KL divergence constraint at each of the interleaved steps. In implementations the policy $\pi_\theta(a|s, i)$ may be separated into components for the categorical distributions, the means of the low-level distributions, and the covariances of the low-level distributions, respectively $$\pi_\theta^\alpha(a|s, i),\ \pi_\theta^\mu(a|s, i), \text{ and } \pi_\theta^\Sigma(a|s, i) \text{ where } \log\ \pi_\theta(a|s, i) = \log\ \pi_\theta^\alpha(a|s, i) = \log\ \pi_\theta^\mu(a|s, i) + \log\ \pi_\theta^\Sigma(a|s, i).$$

Then separate respective bounds $\epsilon_\alpha$, $\epsilon_\mu$, and $\epsilon_\Sigma$ may be applied to each. This allows different learning rates; for example $\epsilon_\mu$ may be relatively higher than $\epsilon_\alpha$ and $\epsilon_\Sigma$ to maintain exploration.

Ensuring that the updated values stay within a trust region of the current values can effectively mitigate optimization instabilities during the training, which can be particularly important in the described multi-task setting when training using a real-world agent, e.g., because instabilities can result in damage to the real-world agent or because the combination of instabilities and the relatively limited amount of data that can be collected by the real-world agent results in the agent being unable to learn one or more of the tasks.

The system also separately performs a policy evaluation step to update the state-action value function, as described further below.

To generate the updated values of the policy parameters, for each observation in each of the one or more trajectories, the system samples $N_s$ actions from the hierarchical controller (or from a target hierarchical controller as described below) in accordance with current values of the policy parameters (step 304). In other words, the system processes each observation using the hierarchical controller (or the target hierarchical controller as described below) in accordance with current values of the policy parameters to generate a combined probability distribution and then samples $N_s$ actions from the combined probability distribution. $N_s$ is generally a fixed number greater than one, e.g., two, four, ten, or twelve.

The system updates the policy parameters (step 306), fitting the combined probability distribution to the intermediate non-parametric policy effectively using supervised learning. In particular, the system can determine a gradient with respect to the policy parameters, i.e., the parameters of the low-level controllers and the high-level controller of a loss function that satisfies:

$$\sum_{s_t\in\tau}\sum_{j=1}^{N_s}\exp\left(\frac{Q(s_t, a_j, i)}{\eta}\right)\log \pi_\theta(a_j \mid s_t, i),$$

where the outside sum is a sum over observations $s_t$ in the one or more trajectories $\tau$, the inner sum is a sum over the $N_s$ actions sampled from the hierarchical controller, $\eta$ is the temperature parameter, $Q(s_t, a_j, i)$ is the output of the state-action value function for observation $s_t$, action $a_j$, and task i, and $\pi_\theta(a_j|s_t, i)$ is the probability assigned to action $a_j$ by processing the observation $s_t$ and data identifying the task i. The temperature parameter $\eta$ is learned jointly with the training of hierarchical controller, as described below with reference to step 306.

The system then determines an update from the determined gradient. For example, the update can be equal to or directly proportional to the negative of the determined gradient.

The system can then apply an optimizer, e.g., the Adam optimizer, the rmsProp optimizer, the stochastic gradient descent optimizer, or another appropriate machine learning optimizer, to the current policy parameter values and the determined update to generate the updated policy parameter values.

In implementations the system updates the temperature parameter (step 308). In particular, the system can determine an update to the temperature parameter that satisfies:

$$\nabla_\eta \eta\epsilon + \eta\sum_{s_t\in\tau}\log\frac{1}{N_s}\sum_{j=1}^{N_s}\exp\left(\frac{Q(s_t, a_j, i)}{\eta}\right).$$

where $\epsilon$ is a parameter defining a bound on a KL divergence of the intermediate probability distribution from the reference policy e.g. a version such as an old version of the combined probability distribution.

The system can then apply an optimizer, e.g., the Adam optimizer, the rmsProp optimizer, the stochastic gradient descent optimizer, or another appropriate machine learning optimizer, to the current temperature parameter and the determined update to generate the updated temperature parameter.

In implementations the system incorporates the KL constraint into the updating of the policy parameters through Lagrangian relaxation and computes the updates using $N_s$ gradient descent steps per observation.

When determining updated policy parameters by decreasing the (KL) divergence as previously described the trust region constraint may be imposed by a form of trust region loss:

$$\alpha\left(\epsilon_m - E_{s\sim D, i\sim I}\left[\mathcal{T}\left(\pi_{\theta_k}(a \mid s, i), \pi_\theta(a \mid s, i)\right)\right]\right)$$

where $\mathcal{T}(\bullet)$ is a measure of distance between old and current policies $\pi_\theta(a|s, i)$ and $\pi_{\theta_k}(a|s, i)$, $\alpha$ is a further temperature-like parameter (a Langrange multiplier), and $\epsilon_m$ is a bound on the parameter update step. In implementations $\mathcal{T}(\pi_{\theta_k}(a|s, i), \pi_\theta(a|s, i)) = \mathcal{T}_H(s, i) + \mathcal{T}_L(s)$ where $\mathcal{T}_H(s, i)$ is a measure of KL divergence between the old and current categorical distributions from the high level controller for the set of low-level controllers, and $\mathcal{T}_L(s)$ is a measure of KL divergence between the old and current probability distributions from the low-level controllers. For example $$\pi_\theta(a \mid s,\ i) = \sum_{j=1}^{M}\alpha_\theta^j(s, i)\mathcal{N}_\theta^j(s)$$

where $$\alpha_\theta^j(s, i)$$

are the categorical distributions and $$\sum_{j=1}^{M} a_\theta^j(s, i) = 1$$

and $\mathcal{N}_\theta^j$ (s) are Gaussian representations of the probability distributions from the low-level controllers, $$\mathcal{T}_H(s, i) = KL\left(\left\{\alpha_{\theta_k}^j(s, i)\right\}_{j=1 \ldots M} \| \left\{\alpha_\theta^j(s, i)\right\}_{j=1 \ldots M}\right), \text{ and}$$

$$\mathcal{T}_L(s) = \frac{1}{M} \sum_{j=1}^{M} KL\left(\mathcal{N}_{\theta_k}^j(s) \| \mathcal{N}_\theta^j(s)\right).$$

In implementations the policies may be separated as previously described, that is separate probability distributions may be determined for the categorical distributions, the means of the low-level distributions, and the covariances of the low-level distributions, and a separate bound ($\epsilon_\alpha$, $\epsilon_\mu$, and $\epsilon_\Sigma$) applied for each distribution.

The system performs a policy improvement step to update the state-value function, i.e., to update the values of the parameters of the state-value function neural network implementing the function (step 310).

Because the state-value function is independent of the form of the hierarchical controller, the system can use any conventional Q-updating technique to update the neural network using the observations, actions, and rewards in the tuples in the one or more sampled trajectories.

As a particular example, the system can compute an update to the parameter values Φ of the neural network as follows:

$$\nabla_\Phi \sum_{i \in I} \sum_{(s_t, a_t \in \tau} \left(\hat{Q}_\Phi(s_t, a_j, i) - Q^{target}\right)^2,$$

where $(s_t, a_t)$ are the observation and action in the t-th tuple in the sampled trajectories and $Q^{target}$ is a target Q value that is generated at least using the reward value for the i-th task in the t-th tuple.

For example, $Q^{target}$ may be an L-step retrace target. Training a multi-task Q network using an L-step retrace target is described in Martin Riedmiller, Roland Hafner, Thomas Lampe, Michael Neunert, Jonas Degrave, Tom Van de Wiele, Volodymyr Mnih, Nicolas Heess, and Jost Tobias Springenberg. Learning by playing—solving sparse reward tasks from scratch. arXiv preprint arXiv:1802.10567, 2018.

As another example, the target may be a TD(0) target as described in Richard S Sutton. Learning to predict by the methods of temporal differences. Machine learning, 3(1):9-44, 1988.

Because each reward includes a respective reward value for each of the i tasks, the system can improve the state-action value function for each of the i tasks from each sampled tuple, i.e., even for tasks that were not being performed when a given sampled tuple was generated.

The system can then apply an optimizer, e.g., the Adam optimizer, the rmsProp optimizer, the stochastic gradient descent optimizer, or another appropriate machine learning optimizer, to the current parameter values and the determined update to generate the updated parameter values.

In implementations a target hierarchical controller, i.e., a target version of the policy parameters, may be maintained to define an "old" policy (combined probability distribution) and updated to the current policy after a target number of iterations. The target version of the policy parameters may be used, e.g. by an actor version of the controller, to generate agent experience i.e. trajectories to be stored in the memory, to sample the $N_s$ actions for each observation in the one or more trajectories as described above, or both. In some implementations a target version of the state-value function neural network is maintained for the Q-learning and updated from a current version of the state-value function neural network after the target number of iterations.

Thus, by training the hierarchical controller by repeatedly performing the process 300, the system can learn a high-quality multi-task policy in an extremely stable and data efficient manner. This makes the described techniques particularly useful for tasks performed by a real, i.e., real-world, robot or other mechanical agent, as wear and tear and risk of mechanical failure as a result of repeatedly interacting with the environment are greatly reduced.

Additionally, when some of the tasks are auxiliary tasks, training using the process 300 allows the system to learn an effective policy even on complex, continuous control tasks and to leverage the auxiliary tasks to learn a complex final task using interaction data collected by the real-world robot much quicker and while consuming many fewer computational resources than conventional techniques.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer implemented method of controlling a mechanical or electronic agent to perform a plurality of tasks while interacting with an environment, the method comprising:

obtaining an observation characterizing a current state of the environment and data identifying a task from the plurality of tasks currently being performed by the agent;

processing the observation and the data identifying the task using a high-level controller neural network to generate a task-dependent high-level probability distribution that assigns a respective probability to each of a plurality of low-level controller neural networks, wherein the high-level controller neural network and the plurality of low-level controller neural networks have been trained for controlling the agent;

processing, independent of the data identifying the task, the observation using each of the plurality of low-level controller neural networks to generate, for each of the plurality of low-level controller neural networks, a respective task-independent low-level probability distribution that assigns a respective probability to each action in a space of possible actions that can be performed by the agent;

generating a combined probability distribution that assigns a respective probability to each action in the space of possible actions by computing a weighted sum of the task-independent low-level probability distributions in accordance with the probabilities in the task-dependent high-level probability distribution; and selecting, using the combined probability distribution, an action from the space of possible actions to be performed by the agent in response to the observation.

2. The method of claim 1, wherein the high-level controller neural network and the low-level controller neural networks have been trained jointly on a multi-task learning reinforcement learning objective.

3. The method of claim 1, wherein each low-level controller neural network generates as output parameters of a probability distribution over a continuous space of actions.

4. The method of claim 3, wherein the parameters are means and covariances of a multi-variate Normal distribution over the continuous space of actions.

5. A method of training a hierarchical controller neural network comprising a high-level controller neural network and a plurality of low-level controller neural networks for controlling a mechanical or electronic agent interacting with an environment, the method comprising:

sampling one or more trajectories from a memory and a task from a plurality of tasks, wherein each trajectory comprises a plurality of observations; and determining updated values for parameters of the high-level controller neural network and the low-level controller neural networks that (i) result in a decreased divergence between, for each of the observations in the one or more trajectories, 1) an intermediate probability distribution over a space of possible actions for the observation and for the sampled task generated using a state-action value function and 2) a probability distribution for the observation and the sampled task generated by the hierarchical controller neural network by processing the observation and data identifying the sampled task using the high-level controller neural network to generate a task-dependent high-level probability distribution that assigns a respective probability to each of a plurality of low-level controller neural networks and processing, independent of the data identifying the task, the observation using each of the plurality of low-level controller neural networks, and (ii) are still within a trust region of current values of the parameters of the high-level controller neural network and the low-level controller neural networks, wherein the state-action value function maps an observation-action-task input to a Q value estimating a return received for the task if the agent performs the action in response to the observation.

6. The method of claim 5, further comprising:

performing a policy improvement step to update the state-action value function.

7. The method of claim 5, wherein determining the updated values comprises:

determining a gradient with respect to the parameters of the low-level controller neural networks and the high-level controller neural network of a loss function that satisfies:

$$\sum_{s_t \in \tau} \sum_{j=1}^{N_s} \exp\left(\frac{Q(s_t, a_j, i)}{\eta}\right) \log \pi_\theta(a_j | s_t, i),$$

where the outside sum is a sum over observation $s_t$ in the one or more trajectories $\tau$, the inner sum is a sum over $N_s$ actions sampled from the hierarchical controller neural network, $\eta$ is a temperature parameter, $Q(s_t, a_j, i)$ is the output of the state-action value function for observation $s_t$, action $a_j$, and task i, and $\pi_\theta(a_j|s_t, i)$ is the probability assigned to action $a_j$ by processing the observation $s_t$ and data identifying the task i.

8. The method of claim 7, further comprising:

sampling, for each of the observations in the one or more trajectories, the $N_s$ actions in accordance with the current values of the parameters of the high-level controller neural network and the low-level controller neural networks.

9. The method of claim 7, further comprising:

updating the temperature parameter.

10. The method of claim 9, wherein updating the temperature parameter comprises:

determining an update to the temperature parameter that satisfies:

$$\nabla_\eta \eta\epsilon + \eta \sum_{s_t \in \tau} \log \frac{1}{N_s} \sum_{j=1}^{N_s} \exp\left(\frac{Q(s_t, a_j, i)}{\eta}\right).$$

11. A system comprising one or more computers and one or more storage devices storing instructions that when executed by the one or more computers are operable to cause the one or more computers to perform operations for controlling a mechanical or electronic agent to perform a plurality of tasks while interacting with an environment, the operations comprising:

obtaining an observation characterizing a current state of the environment and data identifying a task from the plurality of tasks currently being performed by the agent;

processing the observation and the data identifying the task using a high-level controller neural network to generate a task-dependent high-level probability distribution that assigns a respective probability to each of a plurality of low-level controller neural networks, wherein the high-level controller neural network and the plurality of low-level controller neural networks have been trained for controlling the agent;

processing, independent of the data identifying the task, the observation using each of the plurality of low-level controller neural networks to generate, for each of the plurality of low-level controller neural networks, a respective task-independent low-level probability distribution that assigns a respective probability to each action in a space of possible actions that can be performed by the agent;

generating a combined probability distribution that assigns a respective probability to each action in the space of possible actions by computing a weighted sum of the task-independent low-level probability distributions in accordance with the probabilities in the task-dependent high-level probability distribution; and selecting, using the combined probability distribution, an action from the space of possible actions to be performed by the agent in response to the observation.

12. The system of claim 11, wherein the high-level controller neural network and the low-level controller neural networks have been trained jointly on a multi-task learning reinforcement learning objective.

13. The system of claim 11, wherein each low-level controller neural network generates as output parameters of a probability distribution over a continuous space of actions.

14. The system of claim 13, wherein the parameters are means and covariances of a multi-variate Normal distribution over the continuous space of actions.

* * * * *